United States Patent
Hemmen et al.

(10) Patent No.: US 12,303,840 B2
(45) Date of Patent: May 20, 2025

(54) METHOD FOR PRODUCING A GAS SEPARATION ARTICLE AND USE THEREOF

(71) Applicant: CONDALIGN AS, Oslo (NO)

(72) Inventors: Henrik Hemmen, Oslo (NO); Linn Cecilie Sørvik, Oslo (NO); Luca Ansaloni, Oslo (NO); Thijs Andries Peters, Bekkestua (NO); Maria Teresa Guzman Gutierrez, Trondheim (NO); Liyuan Deng, Trondheim (NO)

(73) Assignee: CONDALIGN AS, Oslo (NO)

( * ) Notice: Subject to any disclaimer, the term of this patent is extended or adjusted under 35 U.S.C. 154(b) by 340 days.

(21) Appl. No.: 17/757,703

(22) PCT Filed: Dec. 18, 2020

(86) PCT No.: PCT/EP2020/087234
§ 371 (c)(1),
(2) Date: Jun. 17, 2022

(87) PCT Pub. No.: WO2021/123316
PCT Pub. Date: Jun. 24, 2021

(65) Prior Publication Data
US 2023/0022574 A1    Jan. 26, 2023

(30) Foreign Application Priority Data
Dec. 19, 2019 (NO) .................................. 20191497

(51) Int. Cl.
*B01D 53/22* (2006.01)
*B01D 69/10* (2006.01)
*B01D 69/14* (2006.01)

(52) U.S. Cl.
CPC ......... *B01D 69/107* (2022.08); *B01D 53/228* (2013.01); *B01D 69/14* (2013.01); *B01D 2256/16* (2013.01)

(58) Field of Classification Search
CPC .. B01D 69/107; B01D 53/228; B01D 53/222; B01D 53/221; B01D 53/223;
(Continued)

(56) References Cited

U.S. PATENT DOCUMENTS

| 5,034,130 A | 7/1991 | Nakamura et al. |
| 2011/0220574 A1 | 9/2011 | Bakajin et al. |

(Continued)

FOREIGN PATENT DOCUMENTS

| EP | 3369474 A1 | 9/2018 |
| JP | 2018192441 A | 12/2018 |

(Continued)

OTHER PUBLICATIONS

International Search Report and Written Opinion of the International Application No. PCT/EP2020/087234 mailed Mar. 16, 2021.
(Continued)

*Primary Examiner* — Frank M Lawrence, Jr.
(74) *Attorney, Agent, or Firm* — Heslin Rothenberg Farley & Mesiti P.C.; George S. Blasiak, Esq.

(57) ABSTRACT

The present disclosure provides a method for producing a gas separation article, said gas separation article comprising: a gas separation membrane, optionally a support, and optionally an additional support. The present disclosure also provides a gas separation article obtainable by the aforementioned method as well as use of said gas separation article for separation of gases in a gas mixture.

22 Claims, 3 Drawing Sheets

(58) Field of Classification Search
CPC .. B01D 53/224; B01D 69/14; B01D 2256/16; B01D 2256/12; B01D 2256/18; B01D 2256/245; B01D 2257/102; B01D 2257/304; B01D 2257/504; B01D 2323/30; B01D 71/06–82; B01D 2323/35; B01D 53/22; B01D 67/00; B01D 67/0002; B01D 67/0006; B01D 67/0009; B01D 67/00091; Y02C 20/40
USPC .............................. 96/4, 7–14; 95/43, 45–55
See application file for complete search history.

(56) References Cited

U.S. PATENT DOCUMENTS

| | | | |
|---|---|---|---|
| 2012/0116024 A1* | 5/2012 | Iyoda | B01D 71/80 525/299 |
| 2021/0129084 A1* | 5/2021 | Abetz | B01D 71/80 |

FOREIGN PATENT DOCUMENTS

| | | | | |
|---|---|---|---|---|
| KR | 20080083805 A | 9/2008 | | |
| WO | WO-0197950 A1 * | 12/2001 | ......... | B01D 67/0018 |
| WO | WO 2001097950 A1 | 12/2001 | | |
| WO | WO 2004005380 A1 | 1/2004 | | |

OTHER PUBLICATIONS

Brunetti et al., "Membrane Technologies for $CO_2$ Separation", Journal of Membrane Science 359 (2010) 115-125.

European Patent Office, Office Action, mailed Feb. 25, 2025. 4 pages.

United Kingdom Intellectual Property Office, Office Action, mailed Feb. 23, 2022. 4 pages.

* cited by examiner

METHOD FOR PRODUCING A GAS SEPARATION ARTICLE AND USE THEREOF

CROSS REFERENCE TO RELATED APPLICATIONS

This application is a national stage filing under section 371 of International Application No. PCT/EP2020/087234 filed on Dec. 18, 2020, and published on Jun. 24, 2021 as WO2021/123316 A1, which claims priority to Norway application No. 20191497 filed on Dec. 19, 2019. The entire contents of WO2021/123316 A1 are hereby incorporated herein by reference.

TECHNICAL FIELD

The present disclosure relates to a gas separation article allowing for separation of gases in a gas mixture. The present disclosure also relates to a method for producing the gas separation article as well as use of the gas separation article for separating gases in a gas mixture.

BACKGROUND

Membranes for separation of gases in a gas mixture, i.e. gas separation membranes, are based on the physical and/or chemical interaction of the gases in the gas mixture with the membrane material. A wide variety of gas separation membranes are known and the use thereof frequently depends on the specific design of the membrane. For instance, the choice of membrane material may impact the membrane performance in terms of permeability and selectivity for specific gases allowing some gases to pass through the membrane faster than others. Further, the membrane material may comprise pores and/or further components to provide a specific gas permeability.

Gas separation membranes are used in many diverse applications such as gas purification or recovery, air separation, natural gas sweetening, vapor recovery, separation of by-products, in oil and gas related industries etc. Membrane separation technologies are considered as energy-efficient and compact solutions compared to conventional absorption-desorption technologies.

Traditional polymeric membranes have increased the commercial market for separations such as $O_2/N_2$ and $CO_2/CH_4$. These gas separation membranes comprise a polymer or mixture of polymers as membrane material and have been found to be economically and technologically useful. This stems from the low cost of polymeric membranes, and their high ductility and processability. However, there is often a limit on their performance known as the Robeson upper bound implying that there is a trade-off between selectivity and permeability.

However, the relatively low performance of commercial polymers and the sensitivity towards harsh process conditions of gas streams have demonstrated the need for development of new high-performance materials. There exists thus a need for gas separation membranes such as polymer-based separation membranes allowing for good gas selectivity and/or gas permeability for a gas mixture. Further, there exists a need for gas separation membranes allowing for separation such as improved separation of gases in a gas mixture which has not been provided by hitherto known techniques. Moreover, there is a need for manufacturing methods of such gas separation membranes.

SUMMARY

It is an object of the present disclosure to provide a method for producing a gas separation article allowing for permeability and/or selectivity with respect to separation of gases in a gas mixture. Further, it is an object of the present disclosure to provide a gas separation article such as a gas separation membrane allowing for permeability and/or selectivity with respect to separation of gases in a gas mixture. Moreover, it is an object of the present disclosure to provide improved permeability and/or separation of gases in a gas mixture which has not been provided by hitherto known techniques.

DESCRIPTION

The present disclosure provides a method for producing a gas separation article, said gas separation article comprising:
a gas separation membrane,
optionally a support, and
optionally an additional support,
said method comprising the steps of:
a) providing a matrix,
said matrix having a viscosity from 1 centipoise to 40000 centipoise,
said matrix comprising or consisting of one or more monomers, oligomers and/or polymers and optionally a solvent,
b) contacting the matrix of step a) with a support comprising at least one side, said at least one side facing said matrix, thereby forming (i) a matrix side contacting the support and (ii) a matrix side opposite the side contacting the support,
c) optionally contacting the matrix side opposite the side contacting the support with an additional support,
d) subjecting said matrix contacted with said support to one or more electric fields that is/are
substantially parallel to a plane in which the support extends, or
substantially perpendicular to a plane in which the support extends
e) fixating the one or more monomers, oligomers and/or polymers of the matrix subjected to one or more electric fields in step d) thereby forming a solid gas separation membrane, and
f) optionally removing the support and/or the additional support.

The matrix of the method described herein is free from added particles such as graphite particles, metal particles, ceramic particles. Additionally, the entire gas separation article may be free from particles such as added particles.

The matrix described herein is free from-particles such as graphite particles, metal particles and/or ceramic particles. Further examples of added particles include particles that are able to assemble into a structure such as an ordered structure when subjected to an electric field.

The method steps of the method described herein may be performed in consecutive order or some of the method steps may overlap. For instance, steps d) and e) may overlap so that the electric field(s) is/are applied during step e).

Step e) of the method described herein may comprise curing. The curing may involve solvent evaporation, heating and/or irradiation such as irradiation with ultraviolet light and/or evaporation of a solvent and/or exposure to a curing agent such as oxygen or moisture. As a result, the matrix is solidified.

The fixating of step e) may result in solidifying the matrix. As a result the one or more polymers are immobilized and movement or drift of the one or more polymers is prevented. The fixating may take place by solvent removal. Additionally or alternatively, the fixating may take place using curing such as curing involving heat and/or light such as UV light. The solvent removal may involve drying. Thus, the fixating of the method described herein may convert the matrix into a solid material, i.e. the matrix may be solidified.

The gas separation article described herein may be a gas separation membrane. The gas separation membrane may comprise a porous support and/or a porous additional support. Alternatively, the gas separation membrane may be free from a support and an additional support. When the gas separation article is provided with a non-porous support and, if present, a non-porous additional support it may be considered an intermediate for providing a gas separation membrane. Further, when the gas separation article is provided with a porous support and a non-porous additional support it may be considered an intermediate for providing a gas separation membrane.

It will be appreciated that the expression "substantially parallel to a plane in which the support extends" intends that the electric field lines are parallel to a plane in which the support extends and/or that the electric field lines, such as 50% or more of the electric field lines, deviate by 10 degrees or less from a plane in which the support extends.

Further, it will be appreciated that the expression "substantially perpendicular to a plane in which the support extends" intends that the electric field lines are perpendicular to a plane in which the support extends and/or that the electric field lines, such as 50% or of the electric field lines, deviate by 10 degrees or less from a plane that is perpendicular to a plane which the support extends.

The one or more polymers may be a single polymer or a mixture of different polymers. Examples of the one or more polymers include one or more of the following: polyurethane, polyether block amide, polyimide, polydimethylsiloxane, polyethylene glycol, ethylene acrylic elastomer, perfluoropolymers, polymerized ionic liquids, polysulfone, polyamide, polyvinylamine, polyallylamine, polyethyleneimine, cyanoacrylates, rosin acrylates, ester acrylates, urethanes acrylates, silicone acrylates, amine acrylates, epoxy acrylates, epoxide groups, polyethylene, poly (tetramethylene oxide), polyethylene oxide, polyphenylene oxide, polydioxolane). For instance, the one or more polymers may comprise or consist of polyurethane such as acrylated polyurethane and/or polyether block amide. It will be appreciated that the monomers and/or oligomers may be polymerized into one or more of the aforementioned polymers.

The support and/or additional support may comprise one or more of the following: polyethylene terephthalate (PET), polysiloxanes, polydimethylsiloxane (PMDS), poly (1-trimethylsilyl-1-propyne) (PTMSP), polyacrylonitrile (PAN), perfluoropolymers, perfluoroethers (PTFE), polyvinylidene fluoride (PVDF), polyether sulfones (PES), polysulfones (PSU), polyimides (PI), polyetherimides (PEI), polyamides, polyamideimides, polycarbonates (PC), polyesters, polyether ether ketone (PEEK), poly (ethylene oxide) (PPO), polyacrylates, polymethacrylates, cellulose acetate, polyethylene (PE), polypropylene (PP) polytetrafluoroethylene (PTFE), polymethylpentene (PMP) and copolymers thereof.

The present disclosure also provides a gas separation article such as a gas separation membrane obtained or obtainable by the method as described herein.

Surprisingly, it has been found that the method described herein allows for providing a gas separation membrane providing increased permeability and/or selectivity of gases when the gases or gas mixtures containing gases are exposed to the gas separation membrane as compared to a corresponding gas separation membrane in which the polymer has not been exposed to an electric field.

While not wishing to be bound by any specific theory, exposing the matrix to one or more electric fields before and optionally during the solvent removal causes the one or more polymers chains, such as the backbones of the one or more polymers, to align with the direction of the electric field lines. In other words, the polymer chains become oriented parallel or substantially parallel with the electric field lines. Thus, for one or more electric fields that are parallel with a plane in which a support extends the backbones of the polymer chains may be parallel with said one or more electric fields and said plane. In the same way, for one or more electric fields that are perpendicular with a plane in which a support extends the backbones of the polymer chains may be perpendicular with said one or more electric fields and said plane.

Following the alignment of the polymer chains with the electric field lines the solvent is removed thereby providing a solid gas separation membrane. The solvent removal is believed to fixate the one or more polymers, i.e. lock the one or more polymers, in the alignment imposed by the one or more electric fields. Further, the solvent removal assembles and solidifies the one or more polymers so that the gas separation membrane is formed.

The solvent removal step e) comprises removal of all or substantially all of the solvent, such as 90%, 95%, 99% or more of the solvent. Advantageously, the solvent is volatile thereby facilitating solvent removal. For instance, the solvent may be volatile at room temperature. As used herein, room temperature intends a temperature within the range of from about 20° C. to about 25° C., such as about 22° C. A suitable solvent may be ethanol, acetone, water, 1-butanol, isobutanol, hexafluoroisopropanol, N-methyl-2-pyrrolidone, dimethylformamide, formic acid, dimethylacetamide, dicloromethane, dioxane, dicloromethane, cyrene, y-butyrolactone or a mixture of any of the foregoing solvents. However, it will be appreciated that the choice of solvent will depend on the one or more polymers being used.

The one or more electric fields may be alternating electric field(s). Further, the one or more electric fields may be created by application of an interdigitated electrode as shown in FIG. 1 providing one or more electric fields that is/are parallel with the plane in which the support extends. In this document, this arrangement is referred to as in-plane alignment. Further, it will be appreciated that when the one or more electric fields may be created by application of a top electrode and a bottom electrode as illustrated in FIG. 2 providing one or more electric fields that is/are perpendicular with the plane in which the support extends. In this document, this arrangement is referred to as through plane alignment.

The matrix described herein may be viscous. As used herein, a viscous material intends a material that may have a viscosity of about 1 cP or more, such as about 100 cP or more, such as about 200 cP or more, such as about 1000 cP, 35000 cP or about 40000 cP. As an example, the viscous matrix may have a viscosity within the range of about from 1 cP to about 40000 cP, such as from about 100 cP to about 40000 cP, such as from about 200 cP to about 40000 cP. In this document, cP stands for centipoise. The viscous material may be easily coatable to a thin film. The viscosity must not be too high so that a pump cannot pump it, and not too thin (low viscosity) to not leak from everywhere or not holding together as a coating.

There is also provided a use of a gas separation article as described herein for separation of gases in a gas mixture comprising one of more of the following:
oxygen and nitrogen,
carbon dioxide and methane,
carbon dioxide and natural gas,
carbon dioxide and biogas,
Carbon dioxide and nitrogen,
hydrogen sulfide and methane,
hydrogen sulfide and natural gas,
hydrogen sulfide and biogas,
helium and nitrogen,
hydrogen and methane,
helium and methane,
helium and hydrogen,
hydrogen and carbon dioxide,
helium and carbon dioxide,
nitrogen and methane,
hydrogen and nitrogen,
hydrogen and carbon monoxide.
propene and nitrogen,
ethylene and nitrogen,
ethylene and argon,
vapor and natural gas.

For instance, there is provided a use a gas separation article as described herein for separation of gases in a gas mixture comprising one of more of the following: carbon dioxide and natural gas
carbon dioxide and nitrogen,
oxygen and nitrogen,
hydrogen and nitrogen,
vapor and natural gas,
hydrogen and carbon dioxide.

In particular, there is provided a use of gas separation article as described herein for separation of carbon dioxide and natural gas.

DESCRIPTION OF THE DRAWINGS

In FIG. 1, the numbers designate the following: 1 is matrix, 2 is support, 3 is roll, 4 is additional support, 5 is direction of the electric field, 6 is electrode, 7 is curing chamber, 8 is solidified matrix.

In FIG. 2, the numbers designate the following: 1 is matrix, 2 is support, 3 is roll, 4 is additional support, 5 is direction of the electric field, 6 is top electrode, 7 is bottom electrode, 8 is curing chamber, 9 is solidified matrix.

Figure 1:
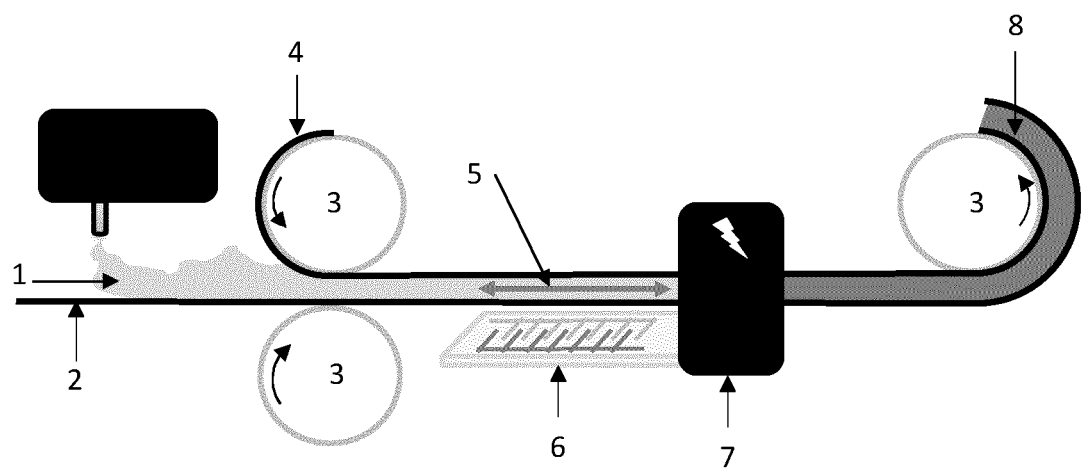
FIG. 1 shows a process for producing a gas separation article as described herein comprising use of an interdigitated electrode. The electric field generated by the electrode is parallel to the plane in which the support extends. The use of an additional support is also shown. The arrow shows the direction of the electric field.

The disclosure is further illustrated by the following non-limitative Examples.

EXAMPLES

Abbreviations
STP Standard Temperature and Pressure such as according to the International Union of Pure and Applied Chemistry (IUPAC) and the National Institute of Standards and Technology (NIST).
atm atmosphere
VS versus
kHz kilo Herz
V Volt Example 1

Effect of Electric Field Exposure on the Gas Permeation Performance

The effect of electric field exposure on the gas permeation performance of a commercially available UV-curable acrylated polyurethane was tested (Norland optical adhesive 65 purchased from Tech Optics Limited). The samples, i.e. membranes, were made on a roll to roll set up (R2R) in the absence of an electric field (i.e. not aligned sample) or in the presence of an alternating electric field at 10 KHz and 600 V (i.e. aligned sample). Except for the electric field, both not aligned and aligned samples were made using the same conditions. The aligned samples were either aligned in-plane or through-plane, using the electrode geometries in FIG. 1 and FIG. 2 respectively. No particles were added to the acrylated polyurethane polymer. The membrane thickness was set to 45 µm for all the samples.

Single gas permeation tests for $N_2$ and $CO_2$ across the membranes were performed at 23° C., using a conventional constant volume/variable pressure method. Prior to the test the membranes were dried under vacuum at 45° C. overnight. The upper pressure was kept constant at 2.0 bar for all the gases.

The results presented in Table 1 below show a clear difference in gas transport properties between not aligned polymer membranes (NAL) compared with the membrane exposed to electric field, which was either through-plane aligned (TPA) or in-plane aligned (IPA).

The $CO_2$ permeability, P, was found to be highest for the through-plane aligned membrane, and lowest for the in-plane aligned membrane. The not aligned membrane had a permeability between that of the through-plane aligned membrane and the in-plane aligned membrane. Thus, P ($CO_2$); TPA>NAL>IPA.

The selectivity, a, for $CO_2$ was found to be highest for the in-plane aligned membrane and lowest for the not aligned membrane. The through-plane aligned membrane had a selectivity between that of the in-plane aligned membrane and the not aligned membrane. Thus, a ($CO_2/N_2$); IPA>TPA>NAL Thus, the TPA membrane shows best performance in terms of permeability, whereas the IPA membrane has the best selectivity.

TABLE 1

Pure gas permeability results for polymeric membranes made from NOA 65.

| Membrane | $P(CO_2)$ Barrer | $P(N_2)$ Barrer | Selectivity $\alpha(CO_2/N_2)$ |
|---|---|---|---|
| NAL | 1.01 | 0.04 | 26.6 |
| TPA | 1.59 | 0.03 | 50.6 |
| IPA | 0.79 | 0.014 | 55.5 |

It was observed that through plane alignment significantly increased both the $CO_2$ permeability (P), and the $CO_2/N_2$ selectivity compared to the sample without alignment (i.e. NAL). In plane alignment also increased $CO_2/N_2$ selectivity but with a decreased $CO_2$ and $N_2$ permeability compared to the sample without alignment (i.e. NAL). Thus, the application of an electric field improved the permeability and/or selectivity.

Example 2

Enhanced Permeability and Maintained Selectivity of $CO_2$ in a Polyether Block Amide Using an Electric Field A mixture of pristine Pebax was prepared by dissolving 5 wt % of the polyether block amide Pebax 2533 purchased from Arkema in 95 wt % ethanol absolute (99-100 wt %) purchased from Merck and the mixture was stirred under reflux condition at 70° C. for 3 hours. Two samples of this mixture were prepared.

The first sample was prepared by placing an amount of the mixture on a PET support and thereafter distributed using an automatic film applicator standard purchased from TQC Sheen. The sample was allowed to stand for 20 minutes at about 22° C. thereby allowing for curing by ethanol solvent evaporation, and the resulting membrane had a uniform thickness which was 500 µm. After the solvent had evaporated the membrane was removed from the support The second sample was prepared by placing an amount of the mixture on a PET support and thereafter distributed using an automatic film applicator standard purchased from TQC Sheen. The sample was aligned in-plane with the electrode geometry in FIG. 1 using an alternating electric field at 5 kHz, 600 V. The sample was allowed to stand for 20 minutes at about 22° C. thereby allowing for curing by ethanol solvent evaporation, and the resulting membrane had a thickness which was 500 µm. After the solvent had evaporated the membrane was removed from the support Single gas permeability properties of the membranes were performed at 2 bar and 25° C., using a conventional constant volume/variable pressure method according to the ASTM D1434-82 standard. The gases tested in the permeability setup were pure $CO_2$ 5 (i.e. carbon dioxide gas with a purity of 99.999%), $N_2$ 5 (i.e. nitrogen gas with a purity of 99.999%), and He 4.6 (i.e. helium gas with a purity of 99.996%) all purchased from Aga AS Linde. The results are presented in Table 2 where sample 1 is the first sample, which was not subjected to an electric field, and sample 2 is the second sample, which was subjected to an electric field. It was found that the electric field increased the permeability of the $CO_2$ through the membrane while the selectivity was maintained for $CO_2/N_2$.

TABLE 2

| Sample # | Permeability [barrer] | | | Selectivity | | |
|---|---|---|---|---|---|---|
| | $CO_2$ | $N_2$ | He | $CO_2/N_2$ | $He/N_2$ | $CO_2/He$ |
| 1 | 227 | 8 | 25 | 29 | 3 | 9 |
| 2 | 292 | 9 | 26 | 31 | 3 | 11 |

Example 3

Enhanced Permeability and Selectivity of $CO_2$ in a Mixture of a Polyether Block Amide Polymer and a Polyethylene Polymer Using an Electric Field A mixture of Pebax was prepared by dissolving 5 wt % of the polyether block amide Pebax 2533 purchased from Arkema in 95 wt % ethanol absolute (99-100 wt %) purchased from Merck and the mixture stirred under reflux condition at 70° C. for 3 hours. Polyethylene glycol dimethyl ether (PEGDME) Mn 250 purchased from Sigma Aldrich was added to the mixture at concentrations of 0 wt %, 30 wt %, 40 wt %, and 50 wt % and mixed by a magnetic stirrer overnight. Thereafter it was mixed in an ultrasonic bath for 1 hour. Two samples of each of these four mixtures were prepared with and without an electric field applied to it.

Figure 2:
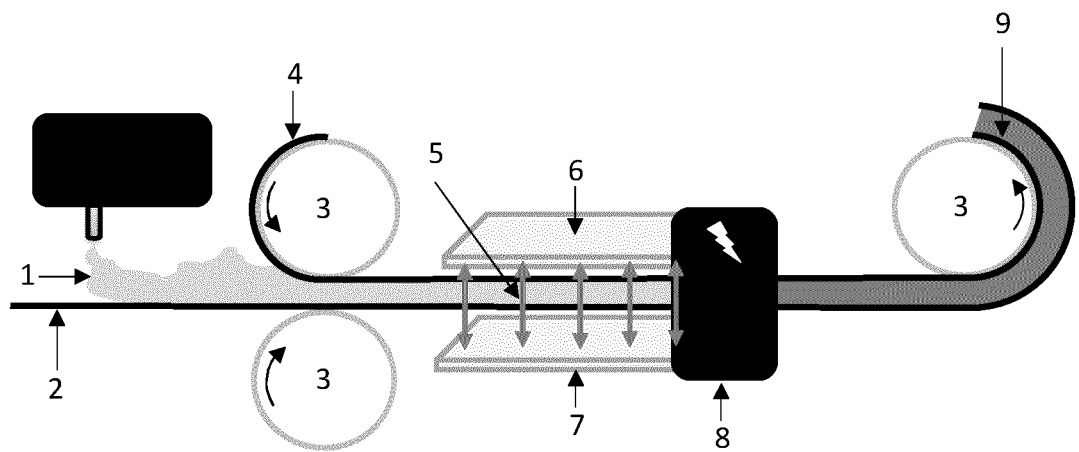
FIG. 2 shows a process for producing a gas separation article comprising use of a top electrode and a bottom electrode. The electric field generated by the electrodes is perpendicular to the plane in which the support extends. The use of an additional support is also shown. The arrow shows the direction of the electric field.
Figure 3A:
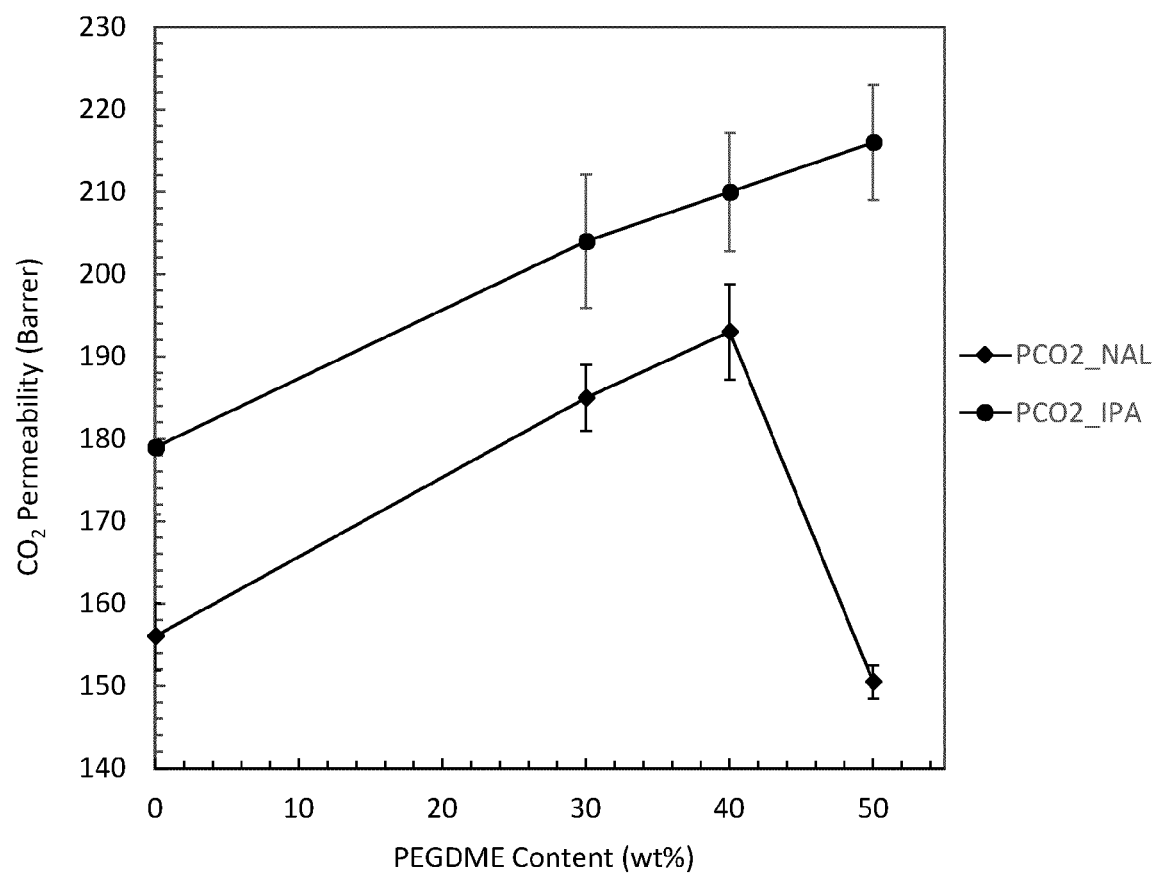
FIG. 3A shows the $CO_2$ permeability as a function of the amount of PEGDME in Pebax 2533.
Figure 3B:
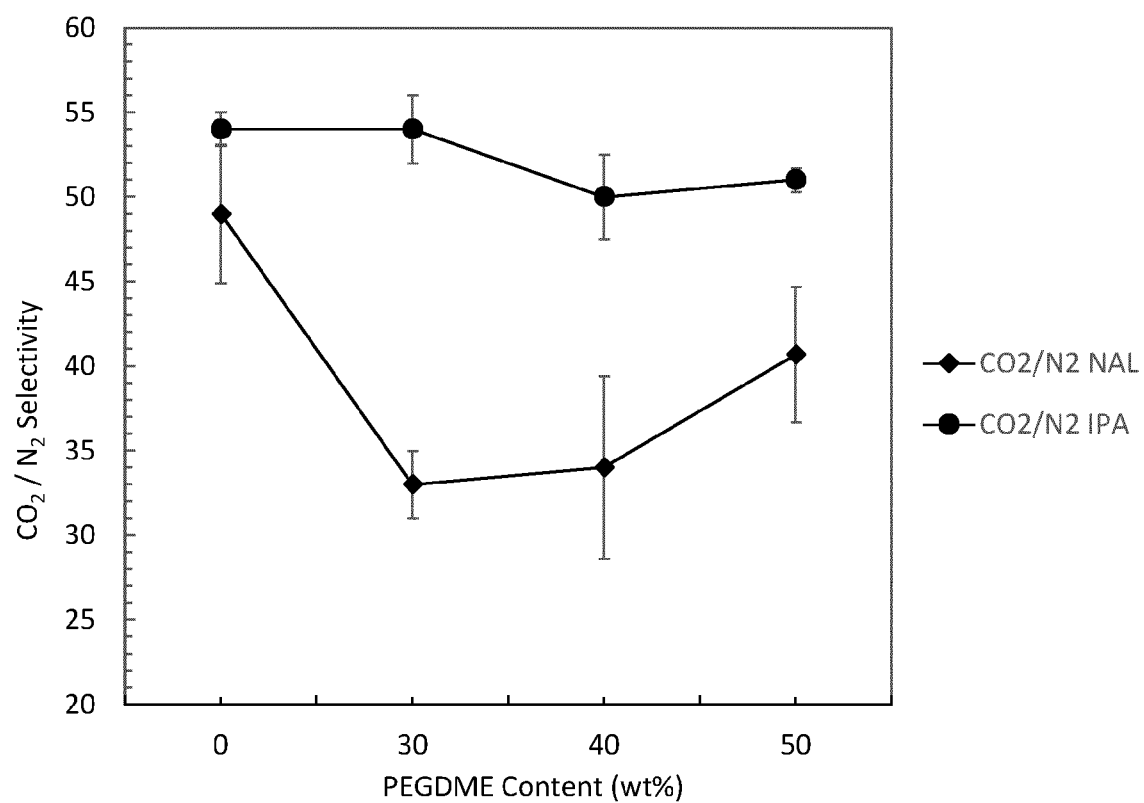
FIG. 3B shows $CO_2/N_2$ selectivity as a function as a function of the amount of PEGDME in Pebax 2533.

Samples without electric field applied were prepared by placing an amount of the mixture on a PET support and thereafter distributed using an automatic film applicator standard purchased from TQC Sheen. The sample was allowed to stand for 20 minutes at about 22° C. thereby allowing for curing by ethanol solvent evaporation, and the resulting membrane had a uniform thickness which was 500 µm. After the solvent had evaporated the membrane was removed from the support Samples with electric field applied were prepared by placing an amount of the mixture on a PET support and thereafter distributed using an automatic film applicator standard purchased from TQXX Sheen. The sample was aligned in-plane with the electrode geometry in FIG. 1 using an electric field at 5 kHz, 600 V. The sample was allowed to stand for 20 minutes at about 22° C. thereby allowing for curing by ethanol solvent evaporation, and the resulting membrane had a uniform thickness which was 500 µm. After the solvent had evaporated the membrane was removed from the support Single gas permeability properties of the samples were performed at 2 bar and 25° C., using a conventional constant volume/variable pressure method according to the ASTM D1434-82 standard. The gases tested in the permeability setup were pure $CO_2$ and $N_2$ both purchased from Aga AS Linde. The results are presented in FIG. 3A and FIG. 3B, respectively. FIG. 3A shows the $CO_2$ permeability as a function of the amount of PEGDME in Pebax 2533. FIG. 3B shows $CO_2/N_2$ selectivity as a function as a function of the amount of PEGDME in Pebax 2533. In FIGS. 3A and 3B the term "NAL" stands for Not Aligned, i.e. no electric field was applied to the sample, and the term "IPA" stands for "In-Plane Aligned", i.e. an electric field with in-plane geometry as indicated in FIG. 1 was applied. Further, PCO stands for permeability of $CO_2$. For a given concentration of PEGDME in the membrane, the $CO_2$ permeability was always higher in the membranes that had been prepared using an electric field compared to the membranes having been prepared in the absence of an electric field. For each of the samples, exposure to the electric field also increased the $CO_2/N_2$ selectivity. It was concluded that exposure of the membrane to an electric field with in-plane geometry increases both permeability and selectivity. This is very beneficial, as higher values are desirable for better membrane performance.

For the samples not exposed to an electric field, increasing the PEGDME concentration up to 40 wt % was found to increase $CO_2$ permeability, whereas in concentrations above 40 wt %, the PEGDME was detrimental for the permeability. For samples exposed to an electric field, an increase in the concentration of PEGDME was accompanied by an increase in permeability, while the $CO_2/N_2$ selectivity was maintained or slightly decreased. This is believed to be the effect of the alignment of PEGDME with the electric field which may create more free volume in the bulk of the polymer chains improving the carbon dioxide permeability.

Example 4

Enhanced Permeability of a Polyether Block Amide Polymer Using an Electric Field in Dry Mixed Gas Permeability Measurements A mixture of Pebax was prepared by dissolving 5 wt % of the polyether block amide Pebax 2533 purchased from Arkema in 95 wt % ethanol absolute (99-100 wt %) purchased from Merck and the mixture was stirred under reflux condition at 70° C. for 3 hours. Two samples of this mixture were prepared.

The first sample was prepared by placing an amount of the mixture on a PET support and thereafter distributed using an automatic film applicator standard purchased from TQC Sheen. The sample was allowed to stand for 20 minutes at about 22° C. thereby allowing for curing by ethanol solvent evaporation for 20 minutes and the resulting membrane had a thickness which was 500 μm. After the solvent had evaporated the membrane was removed from the support The second sample was prepared by placing an amount of the mixture on a PET support and thereafter distributed using an automatic film applicator standard purchased from TQC Sheen. The sample was aligned in-plane with the electrode geometry in FIG. 1 using an electric field at 5 kHz, 600 V. The sample was allowed to stand for 20 minutes at about 22° C. thereby allowing for curing by ethanol solvent evaporation for 20 minutes and the resulting membrane had a thickness which was 500 μm. After the solvent had evaporated the membrane was removed from the support Mixed gas permeability properties of the membranes were performed at 6 bar and 25° C., using a conventional constant volume/variable pressure method according to the ASTM D1434-82 standard. The gases tested in the permeability setup were $CO_2$ 5, $N_2$ 5, and He 4.6 all purchased from Aga AS Linde. The results are presented in Table 3. For the sample subjected to the electric field the permeability was found to increase while the selectivity was maintained or slightly increased.

TABLE 3

| | Permeability of $CO_2$ [barrer] | | | Selectivity | | |
|---|---|---|---|---|---|---|
| Sample # | 10 wt % $CO_2$ 90 wt % $N_2$ | 10 wt % $CO_2$ 90 wt % $CH_4$ | 45 wt % $CO_2$ 55 wt % He | $CO_2/N_2$ | $CO_2/CH_4$ | $CO_2/He$ |
| 1 | 156 | 145 | — | 49 | 12 | — |
| 2 | 161 | 175 | 280 | 52 | 14 | 9.3 |

The invention claimed is:

1. A method for producing a gas separation article,
said gas separation article comprising:
   a gas separation membrane, and
   a support
said method comprising the steps of:
   a) providing a matrix,
   said matrix having a viscosity from 1 centipoise to 40000 centipoise,
   and said matrix comprising or consisting of one or more monomers, oligomers and/or polymers,
   b) contacting the matrix of step a) with the support, wherein the support comprises at least one side, said at least one side facing said matrix, thereby forming (i) a matrix side contacting the support and (ii) a matrix side opposite the side contacting the support,
   c) subjecting said matrix contacted with said support to one or more electric fields that is/are substantially parallel to a plane in which the support extends, or substantially perpendicular to a plane in which the support extends
   d) fixating the one or more monomers, oligomers and/or polymers of the matrix subjected to one or more electric fields in step d) thereby forming a solid gas separation membrane.

2. The method according to claim 1, wherein the matrix does not comprise solid particles.

3. The method according to claim 1, wherein the fixating in step d) converts the one or more monomers and/or oligomers into one or more of the following polymers: polyurethane, polyether block amide, polyimide, polydimethylsiloxane, polyethylene glycol, ethylene acrylic elastomer, perfluoropolymers, polymerized ionic liquids, polysulfone, polyamide, polyvinylamine, polyallylamine, polyethyleneimine, cyanoacrylates, rosin acrylates, ester acrylates, urethanes acrylates, silicone acrylates, amine acrylates, epoxy acrylates, epoxide groups, polyethylene, poly (tetramethylene oxide), polyethylene oxide, polyphenylene oxide, polydioxolane.

4. The method according to claim 1, wherein the matrix comprises or consists of one or more polymers, said one or more polymers being one or more of the following: polyurethane, polyether block amide, polyimide, polydimethylsiloxane, polyethylene glycol, ethylene acrylic elastomer, perfluoropolymers, polymerized ionic liquids, polysulfone, polyamide, polyvinylamine, polyallylamine, polyethyleneimine, cyanoacrylates, rosin acrylates, ester acrylates, urethanes acrylates, silicone acrylates, amine acrylates, epoxy acrylates, epoxide groups, polyethylene, poly (tetramethylene oxide), polyethylene oxide, polyphenylene oxide, polydioxolane.

5. A method according to claim 1, wherein the support is porous.

6. A method according to claim 1, wherein the support is non-porous.

7. A method according to claim 1, wherein the gas-separation article further comprises an additional support.

8. The method according to claim 1, wherein the support comprises one or more of the following: polyethylene terephthalate (PET), polysiloxanes, polydimethylsiloxane (PMDS), poly (1-trimethylsilyl-1-propyne) (PTMSP), polyacrylonitrile (PAN), perfluoropolymers, perfluoroethers (PTFE), polyvinylidene fluoride (PVDF), polyether sulfones (PES), polysulfones (PSU), polyimides (PI), polyetherimides (PEI), polyamides, polyamideimides, polycarbonates (PC), polyesters, polyether ether ketone (PEEK), poly (ethylene oxide) (PEO), polyacrylates, polymethacrylates, cellulose acetate, polyethylene (PE), polypropylene (PP) polytetrafluoroethylene (PTFE), polymethylpentene (PMP) and copolymers thereof.

9. The method according to claim 1, wherein the one or more electric fields is/are alternating electric field(s).

10. The method according to claim 1, wherein step c) comprises orienting the one or more monomers, oligomers and/or polymers to be substantially parallel to the one or more electric fields.

11. The method according to claim 10, wherein the one or more electric fields is/are provided parallel to a plane in which the support extends and only to a first side of the support, said first side of the support being opposite the side of the support facing the matrix.

12. The method according to claim 1, wherein the one or more electric fields is/are provided by an interdigitated electrode.

13. The method according to claim 1, wherein the one or more electric fields is/are substantially perpendicular to a plane in which the support extends.

14. The method according to claim 1, wherein the fixating in step d) comprises curing.

15. The method according to claim 14, wherein the curing comprises one or more of the following: heat, radiation, electron beams, chemical additives, moisture.

16. The method according to claim 1, wherein
the matrix comprises a solvent, and
the fixating in step d) comprises evaporation of said solvent.

17. The method according to claim 1, wherein the fixating of step d) comprises solidifying of the matrix.

18. A gas separation article obtainable by the method according to claim 1.

19. Use of
a gas separation article according to claim 18
for separation of gases in a gas mixture comprising one of more of the following:
oxygen and nitrogen,
carbon dioxide and methane,
carbon dioxide and natural gas,
carbon dioxide and biogas,
carbon dioxide and nitrogen,
hydrogen sulfide and methane,
hydrogen sulfide and natural gas,
hydrogen sulfide and biogas,
hydrogen and methane,
helium and methane,
helium and hydrogen,
hydrogen and carbon dioxide,
helium and carbon dioxide,
nitrogen and methane,
hydrogen and nitrogen,
hydrogen and ammonia,
hydrogen and carbon monoxide,
propene and nitrogen,
ethylene and nitrogen,
ethylene and argon,
vapor and natural gas.

20. Use according to claim 19, wherein the gas mixture comprises one or more of the following:
carbon dioxide and natural gas,
carbon dioxide and nitrogen,
oxygen and nitrogen,
hydrogen and nitrogen,
vapor and natural gas,
hydrogen and carbon dioxide.

21. Use according to claim 19, wherein the gas mixture comprises carbon dioxide and natural gas.

22. The method according to claim 7, wherein the additional support comprises one or more of the following: polyethylene terephthalate (PET), polysiloxanes, polydimethylsiloxane (PMDS), poly (1-trimethylsilyl-1-propyne) (PTMSP), polyacrylonitrile (PAN), perfluoropolymers, perfluoroethers (PTFE), polyvinylidene fluoride (PVDF), polyether sulfones (PES), polysulfones (PSU), polyimides (PI), polyetherimides (PEI), polyamides, polyamideimides, polycarbonates (PC), polyesters, polyether ether ketone (PEEK), poly (ethylene oxide) (PEO), polyacrylates, polymethacrylates, cellulose acetate, polyethylene (PE), polypropylene (PP) polytetrafluoroethylene (PTFE), polymethylpentene (PMP) and copolymers thereof.

* * * * *